(12) United States Patent
Tanaka et al.

(10) Patent No.: US 7,364,786 B2
(45) Date of Patent: Apr. 29, 2008

(54) BIAXIALLY ORIENTED POLYESTER FILM

(75) Inventors: Hiroyuki Tanaka, Otsu (JP);
Kunimasa Tanaka, Takatsuku (JP);
Ryosuke Matsui, Otsu (JP)

(73) Assignee: Toray Industries, Inc. (JP)

( * ) Notice: Subject to any disclaimer, the term of this patent is extended or adjusted under 35 U.S.C. 154(b) by 163 days.

(21) Appl. No.: 10/527,514

(22) PCT Filed: Sep. 10, 2003

(86) PCT No.: PCT/JP03/11541

§ 371 (c)(1),
(2), (4) Date: Apr. 4, 2005

(87) PCT Pub. No.: WO2004/024446

PCT Pub. Date: Mar. 25, 2004

(65) Prior Publication Data
US 2006/0127654 A1 Jun. 15, 2006

(30) Foreign Application Priority Data
Sep. 10, 2002 (JP) .............................. 2002-263755

(51) Int. Cl.
*B32B 7/02* (2006.01)
*B32B 15/09* (2006.01)
*B32B 18/00* (2006.01)
*B32B 27/08* (2006.01)
*B32B 27/36* (2006.01)

(52) U.S. Cl. ..................... 428/212; 428/213; 428/343; 428/347; 428/349; 428/446; 428/458; 428/480; 428/910; 528/308; 528/308.6; 528/308.7

(58) Field of Classification Search ................... None
See application file for complete search history.

(56) References Cited

U.S. PATENT DOCUMENTS

| 3,889,870 | A | * | 6/1975 | Bender ...................... 383/121 |
| 4,692,327 | A | * | 9/1987 | Takahashi et al. .......... 428/458 |
| 4,874,647 | A | * | 10/1989 | Yatsu et al. ................ 428/35.7 |
| 5,427,842 | A | * | 6/1995 | Bland et al. ................ 428/213 |
| 5,604,019 | A | * | 2/1997 | Bland et al. ................ 428/212 |
| 5,747,174 | A | * | 5/1998 | Kimura et al. ............. 428/480 |
| 6,040,061 | A | * | 3/2000 | Bland et al. ................ 428/480 |
| 6,652,979 | B1 | * | 11/2003 | Takahashi et al. ......... 428/458 |
| 2004/0219316 | A1 | * | 11/2004 | Takahashi et al. ......... 428/35.7 |
| 2005/0058846 | A1 | * | 3/2005 | Matsui et al. .............. 428/480 |
| 2005/0100723 | A1 | * | 5/2005 | Tanaka et al. ............. 428/220 |

FOREIGN PATENT DOCUMENTS

| EP | 591055 | A | | 4/1994 |
| EP | 592284 | A | | 4/1994 |
| JP | 2001-179916 | | * | 7/2001 |
| JP | 2001-179916 | A | | 7/2001 |
| JP | 2001-055454 | | * | 2/2004 |

* cited by examiner

*Primary Examiner*—Vivian Chen
(74) *Attorney, Agent, or Firm*—DLA Piper US LLP

(57) ABSTRACT

The biaxially oriented polyester film of the present invention contains a polyester having a primary melting point of 245 to 265° C. as the main component and exhibits a drop bag strength index at 0° C. of at least 2.0 and a strength at break in the film longitudinal direction at 120° C. of at least 100 MPa. The film has superior heat resistance, mechanical strength, impact resistance, and bending resistance and is particularly suitable for packaging materials.

12 Claims, No Drawings

BIAXIALLY ORIENTED POLYESTER FILM

TECHNICAL FIELD

The present invention relates to biaxially oriented polyester films having excellent heat resistance, mechanical strength, impact resistance, and flex resistance.

BACKGROUND ART

Polyester films, in particular, polyester films primarily containing polyethylene terephthalate, have excellent mechanical properties, thermal properties, electrical properties, surface properties, optical properties, heat resistance, and chemical resistance. They are thus used in a wide range of applications including magnetic recording media, industrial materials, and packaging materials. Since polyester films have low resistance to impact and flex pinhole, biaxially stretched nylon films are widely used in packaging material applications. However, nylon films, which have high moisture absorption and coefficient of moisture expansion, require special attention during preservation or processing and are difficult to work by vapor deposition. In order to increase heat resistance, printability, stiffness, and dimensional stability, nylon films are frequently used with polyester films bonded thereto.

Proposals for rendering impact and flex pinhole resistance to polyester films include a method for obtaining a flexible polyester film by copolymerizing polyethylene terephthalate with other components, such as long-chain aliphatic dicarboxylic acid, e.g., dimer acid (Japanese Unexamined Patent Application Publication No. 6-79776); and a method for obtaining a flexible polyester film by blending modified polybutylene terephthalate into polyethylene terephthalate (Japanese Unexamined Patent Application Publication No. 2001-11213). Such flexible films no longer have the inherent advantage of PET films, i.e., high elastic modulus, and tend to require higher costs since expensive comonomers are used. Moreover, conventional flexible films have low heat resistance and are sticky. Thus, troubles, such as clinging, frequently occur during the film making process or film working process.

DISCLOSURE OF INVENTION

The present invention provides a biaxially oriented polyester film having a drop bag strength index of the film at 0° C. of at least 2.0, and a strength at break in the film longitudinal direction at 120° C. of at least 100 Mpa, in which the film comprising a polyester as the main component having a primary melting point in the range of 245 to 265° C.

Preferably, the biaxially oriented polyester film of the present invention has a drop bag strength index at 0° C. of at least 2.0 and a strength at break in the film longitudinal direction at 120° C. of at least 100 MPa, and comprises a total of at least five layers of layers (A layers) mainly composed of an aromatic polyester having a melting point of 245 to 265° C. and layers (B layers) composed of a thermoplastic resin mixture having a melting point of 215 to 265° C., these layers being alternately stacked, wherein the thermoplastic resin mixture contained in the B layers contains 90 to 99.8 wt % of an aromatic polyester and 0.2 to 10.0 wt % of a thermoplastic resin having a glass transition temperature of 20° C. or less, in which the film comprising a polyester as the main component having a primary melting point in the range of 245 to 265° C.

BEST MODE FOR CARRYING OUT THE INVENTION

A biaxially oriented polyester film of the present invention is mainly composed of a polyester having a primary melting point in the range of 245 to 265° C. and has a drop bag strength index at 0° C. of at least 2.0 and a strength at break in the film longitudinal direction at 120° C. of at least 100 MPa.

The polyester contained in the biaxially oriented polyester film of the present invention has a primary melting point in the range of 245 to 265° C. The term "primary melting point" refers to the temperature at a melting peak determined by differential scanning calorimetry at a heating rate of 10° C./min. If two or more melting peaks are detected, the peak temperature having the highest melting calories is determined as the primary melting temperature.

Preferably, the polyester contained in the biaxially oriented polyester film of the present invention is mainly composed of an aromatic polyester composed of at least one aromatic dicarboxylic acid selected from the group consisting of terephthalic acid, isophthalic acid, and 2,6-naphthalene dicarboxylic acid and at least one aliphatic alcohol selected from the group consisting of ethylene glycol, 1,3-propanediol, and 1,4-butanediol.

The biaxially oriented polyester film of the present invention is preferably a polyester, at least 90 mol % of the repeating units of which is polytetramethylene terephthalate and polyethylene terephthalate. The biaxially oriented polyester film composed of the polyester, at least 90 mol % of the repeating units of which is polytetramethylene terephthalate and polyethylene terephthalate, exhibits particularly high mechanical strength and heat resistance and excellent resistance to bending and impact.

The "drop bag strength index at 0° C." refers to the number of times a brine-filled bag prepared by laminating an non-stretched polypropylene sheet and a biaxially oriented polyester film is dropped until the bag breaks in a drop test at 0° C. Non-stretched polypropylene sheets are generally used as a sealant for making bags.

The drop bag strength index at 0° C. was actually determined by the following method.

First, Takelac A610, an adhesive produced by Mitsui Takeda Chemicals, Inc., is mixed with Takenate A50, a hardener produced by Mitsui Takeda Chemicals, Inc., at a 9:1 ratio, and the mixture is diluted with ethyl acetate. The resulting diluted adhesive is applied on a surface of a sample so that the thickness of the applied adhesive is 1 µm after drying, and Torayfan NO T3931, a 60 µm in thickness produced by Toray Plastic Films Co., LTD., is thereby laminated to the biaxially oriented polyester film.

Next, the laminated film is cured at 40° C. for 48 hours, and a bag (20 cm×15 cm) having four sides sealed is made using a heat sealer (160° C.). In the bag, 250 g of 2.5 wt % brine is enclosed, and the bag containing the brine is kept in a refrigerator at 0° C. for 8 hours. Subsequently, the bag containing the brine was dropped from a height of 1.25 m at 0° C. The number of times the bag is dropped until breakage or pinholes occur is examined at least ten times per sample. The average number of times the bag is dropped until the breakage or pinholes occur is defined as the drop bag strength index at 0° C.

A commercially available polyethylene terephthalate has a drop bag strength index of 1.0, i.e., all bags break at a first dropping. The biaxially oriented polyester film of the present invention has high impact resistance at low temperatures and a drop bag strength index of at least 2.0, preferably at least 2.3, and more preferably at least 2.5.

The biaxially oriented polyester film of the present invention has a strength at break in the film longitudinal direction at 120° C. of at least 100 MPa. At a strength at break in the film longitudinal direction at 120° C. of less than 100 MPa, problems of film breaking, partial stretching, contraction in the film transversal direction, etc., might occur due to the tensile force applied during the processing, such as printing, vapor depositing, or bonding, under high temperatures. The biaxially oriented polyester film of the present invention preferably has a strength at break in the film longitudinal direction at 120° C. of at least 120 MPa.

The entire thickness of the biaxially oriented polyester film is preferably 5 to 40 μm and more preferably 10 to 25 μm for packaging film applications, for example.

Preferably, the elastic modulus of the biaxially oriented polyester film of the present invention is at least 3 GPa in both film longitudinal and transversal directions.

In order to impart higher drop bag strength at 0° C. and higher heat resistance to the biaxially oriented polyester film of the present invention, the biaxially oriented polyester film is preferably constituted from a total of at least five layers of layers (A layers) mainly composed of an aromatic polyester having a melting point of 245 to 265° C. and layers (B layers) composed of a thermoplastic resin mixture having a melting point of 215 to 265° C., these layers being alternately stacked, wherein the thermoplastic resin mixture contained in the B layers contains 90 to 99.8 wt % of an aromatic polyester and 0.2 to 10.0 wt % of a thermoplastic resin having a glass transition temperature of 20° C. or less.

Alternatively, in the present invention, a biaxially oriented polyester film having a drop bag strength index at 0° C. of at least 2.0 can be obtained by employing the following film structure.

Total of nine or more of layers (C layers) mainly composed of an aromatic polyester having a melting point in the range of 245 to 265° C. and layers (D layers) mainly composed of a polyester are alternately stacked. The D layers mainly composed of the polyester have a melting point of 210 to 260° C. The polyester constituting the D layers has a melting point 5 to 35° C. lower than the melting point of the polyester constituting the C layers. The total thickness of the D layers is 5 to 20% of the thickness of the entire film. Stretching conditions and thermosetting conditions are adjusted so that the plane orientation of the C layers is relatively high and the plane orientation of the D layers is relatively low.

Preferable embodiments of the biaxially oriented polyester film of the present invention will be explained in detail below.

In a preferred embodiment of the biaxially oriented polyester film of the present invention, the aromatic polyester in the A and B layers is composed of at least one aromatic dicarboxylic acid selected from the group consisting of terephthalic acid, isophthalic acid, and naphthalene dicarboxylic acid and at least one aliphatic alcohol selected from the group consisting of ethylene glycol, 1,3-propanediol, and 1,4-butanediol.

The aromatic polyester contained in the A layers of the biaxially oriented polyester film preferred in the present invention preferably has a melting point in the range of 245 to 265° C. to obtain a film having high heat resistance and high mechanical strength. When the melting point is in the range of 245 to 265° C., the heat resistance and the mechanical strength of the multi-layered film are enhanced. More preferably, the melting point of the aromatic polyester contained in the A layers is in the range of 245 to 265° C.

The thermoplastic resin mixture contained in the B layers of the preferred biaxially oriented polyester film of the present invention preferably has a melting point in the range of 215 to 265° C. More preferably, the melting point of the thermoplastic resin mixture contained in the B layers is in the range of 230 to 255° C.

The thermoplastic resin mixture contained in the B layers of the preferred biaxially oriented polyester film of the present invention preferably contains 90 to 99.8 wt % of an aromatic polyester and 0.2 to 10.0 wt % of a thermoplastic resin having a glass transition temperature of 20° C. or lower. More preferably, the thermoplastic resin mixture contained in the B layers contains 0.5 to 5 wt % of the thermoplastic resin having a glass transition temperature of 20° C. or lower.

When the thermoplastic resin mixture in the B layers of the preferred biaxially oriented polyester film of the present invention has an aromatic polyester content of 90 to 99.8 wt %, the heat resistance and mechanical strength can be increased without decreasing impact resistance and flex resistance.

When the thermoplastic resin mixture in the B layers of the preferred biaxially oriented polyester film of the present invention contains 0.2 to 10.0 wt % of the thermoplastic resin having a glass transition temperature of 20° C. or lower, the heat resistance and mechanical strength can be increased without decreasing impact resistance and flex resistance. Moreover, the film has a higher haze, and thus the film is prevented from readily becoming opaque.

When the melting point of the thermoplastic resin mixture in the thermoplastic resin mixture contained in the B layers of the preferred biaxially oriented polyester film of the present invention is in the range of 215 to 265° C., the heat resistance and mechanical strength are high.

Each B layer composed of the thermoplastic resin mixture in the preferred biaxially oriented polyester film of the present invention exhibits relatively high flex resistance even when it is used alone as a single-layer film. In the biaxially oriented polyester film of the present invention, a total of five or more of the A layers mainly composed of the aromatic polyester having a melting point in the range of 245 to 265° C. and the B layers composed of a thermoplastic resin mixture are preferably alternately stacked to simultaneously achieve heat resistance, mechanical strength, and flex resistance. Moreover, the impact resistance and the flex resistance can be further improved. A film made by stacking five or more layers has excellent impact resistance and flex pinhole resistance. Moreover, such a film does not curl or suffer from a decreased flatness caused by the difference in dimensional changes of the A layers and B layers when the film is heated during processing or during use. In order to further enhance the heat resistance, drop bag strength, and flex pinhole resistance, the film is preferably composed of nine or more, and more preferably fifty to two-hundred of the A and B layers.

The B layers of the preferred biaxially oriented polyester film of the present invention has higher flex resistance and impact resistance than those of the A layers of the preferred biaxially oriented polyester film of the present invention. By alternately stacking A layers and B layers, the flex deformation of the A layers caused can be decreased since B layers function as impact absorbing layers when impact is applied. In general, the impact resistance and flex pinhole resistance of the biaxially oriented polyester film can be further enhanced by increasing the number of layers to be stacked because the flex deformation and the impact absorption can be dispersed.

Preferably, the average thickness of the layers of the preferred biaxially oriented polyester film of the present invention is in 0.02 to 0.5 µm, and more preferably 0.05 to 0.15 µm. If the average thickness of the layers is larger than 0.5 µm, the impact resistance and the flex pinhole resistance of the multi-layered film tend to decrease. This is because, although the B layers of such a thickness alone have sufficient flex resistance and impact resistance, their effects of dispersing the flex deformation and the impact absorption for the A layers becomes to be low. On the contrary, when the average thickness is smaller than 0.02 µm, the layers are excessively thin, the flex resistance and the impact resistance as the single B layer decreases at such a thickness. And impact resistance and flex pinhole resistance of the multi-layered film tend to be low.

More preferably, the main component of the aromatic polyester contained in the A layers of the preferred biaxially oriented polyester film of the present invention is an aromatic polyester whose repeating units are 70 to 95 mol % ethylene terephthalate units and 5 to 30 mol % tetramethylene terephthalate units. When the main component of the aromatic polyester contained in the A layers of the preferred biaxially oriented polyester film of the present invention is an aromatic polyester whose repeating units are 70 to 95 mol % ethylene terephthalate units and 5 to 30 mol % tetramethylene terephthalate units, desired cost effectiveness, mechanical strength, heat resistance, and flex pinhole resistance can be simultaneously achieved. When the content of the ethylene terephthalate units is smaller than 70 mol %, the resulting multi-layered film may have lower heat resistance and mechanical strength. When the content of the tetramethylene terephthalate units exceeds 30 mol %, the resulting film may have lower heat resistance and mechanical strength. When the content of the ethylene terephthalate units is larger than 95 mol %, the resulting multi-layered film may have lower flex resistance. When the content of the butylene terephthalate units is less than 5 mol %, the resulting film may have a lower bending resistance.

The aromatic polyester contained in the A layers of the preferred biaxially oriented polyester film of the present invention may contain a small amount of a comonomer, such as isophthalic acid, propanediol, cyclohexane dimethanol, or long-chain fatty acid. The total amount of the ethylene terephthalate units and the tetramethylene terephthalate units of the aromatic polyester contained in the A layers is preferably 90 mol % or more of the total polyester.

The thermoplastic resin mixture contained in the B layers of the preferred biaxially oriented polyester film of the present invention preferably contains 0.2 to 10.0 wt % of a thermoplastic resin having a glass transition temperature of 30° C. or lower and an aromatic polyester, and the repeating units of the aromatic polyester are 20 to 90 mol % ethylene terephthalate units and 10 to 80 mol % tetramethylene terephthalate units, the total content of the ethylene terephthalate units and the tetramethylene terephthalate units of the aromatic polyester being 90 mol % or more. A film containing such a thermoplastic resin mixture can achieve particularly high impact resistance and flex pinhole resistance.

The content of the ethylene terephthalate units of the thermoplastic resin mixture contained in the B layers is more preferably 50 to 90 mol %, and the content of the tetramethylene terephthalate units is 10 to 50 mol %. When the content of the ethylene terephthalate units in the thermoplastic resin mixture in the B layers is 90 mol % or less, the resulting film will show satisfactory impact resistance and flex pinhole resistance. When the content of the tetramethylene terephthalate units in the thermoplastic resin mixture in the B layers is 10 mol % or more, the resulting film will have satisfactory impact resistance and flex pinhole resistance. When the content of the ethylene terephthalate units in the thermoplastic resin mixture in the B layers is 50 to 90 mol %, the resulting film will be free of problems, such as curls, decreased flatness, and decreased adhesiveness at interfaces, because the difference in heat characteristics between the A and B layers is small.

The difference in melting point between the polyester contained in the A layers of the preferred biaxially oriented polyester film of the present invention and the resin mixture contained in the B layers is preferably 10° C. or less.

Preferably, the outermost layers of the preferred biaxially oriented polyester film of the present invention are A layers.

The A and B layers of the preferred biaxially oriented polyester film of the present invention preferably contain known particles having an average diameter of 0.01 to 5 µm so that handling and processability can be improved. The particles to be contained in the A and B layers of the preferred biaxially oriented polyester film of the present invention are preferably internal particles, inorganic particles, or organic particles. Each of the A and B layers of the preferred biaxially oriented polyester film of the present invention preferably contains 0.01 to 3 wt %, more preferably 0.05 to 3 wt %, more preferably 0.1 to 3 wt %, and most preferably 0.3 to 3 wt % of the particles.

Any of the conventional technique may be used to deposit internal particles contained in the A and B layers of the preferred biaxially oriented polyester film of the present invention. Examples thereof include the techniques disclosed in Japanese Unexamined Patent Application Publication No. 48-61556, 51-12860, 53-41355, and 54-90397. Furthermore, other particles, such as those disclosed in Japanese Examined Patent Application Publication No. 55-20496 and Japanese Unexamined Patent Application Publication No. 59-204617, can be used in combination. An average particle diameter of 0.01 to 5 µm will not cause any defect in the film.

Examples of the inorganic particles that can be incorporated in the A and B layers of the preferred biaxially oriented polyester film of the present invention include wet and dry silica, colloidal silica, aluminum silicate, titanium oxide, calcium carbonate, calcium phosphate, barium sulfate, aluminum oxide, mica, kaolin, and clay. Examples of the organic particles include particles composed of styrene, silicone, acrylates, methacrylates, polyesters, and divinyl compounds. Among these, inorganic particles, such as wet and dry silica and alumina, and particles composed of styrene, silicone, acrylic acid, methacrylic acid, polyester, and divinyl benzene are particularly preferable. Two or more types of these internal particles, inorganic particles, and organic particles may be used in combination.

The ratio of the total thickness $\Sigma Ta$ of the A layers of the preferred biaxially oriented polyester film of the present invention to the total thickness $\Sigma Tb$ of the B layers ($\Sigma Ta/\Sigma Tb$) is preferably 1 to 10 and more preferably 2 to 7. At Ta/Tb less than 1, the resulting film may have lower heat resistance and mechanical strength. At a ratio larger than 10, the resulting film may have lower impact resistance and flex pinhole resistance.

The preferred biaxially oriented polyester film of the present invention is preferably a multi-layered film consisting of 5 or more layers. Since the preferred biaxially oriented polyester film is made by alternately stacking polymer A and polymer B, two or more melt extruders are used. In a preferred production method, the polymers are respectively supplied to the extruders, melt-extruded, and stacked using a feed block, a static mixer, or a multimanifold installed on a T die.

A particularly preferable production method includes the steps of stacking three or more layers of polymers A and B using a feed block, increasing the number of stacked layers using a static mixer, extrude them from a T die to form a sheet, and quenching the sheet on metal cooling rollers to obtain an unstretched sheet. During this process, in order to reduce the thickness irregularity among the layers and to obtain a film having high adhesive force between layers, the difference in melting point between the polyester in the A layers and the thermoplastic resin mixture of the B layers is preferably 10° C. or less. The outermost layers of the stack are preferably the A layers since the slidability and the heat resistance at surfaces can be improved.

Preferably, a deposition layer composed of at least one metal compound selected from the group consisting of metallic aluminum, silicon oxide, and aluminum oxide is provided on at least one surface of the biaxially oriented polyester film of the present invention produced as above.

The metal compound to be deposited on the biaxially oriented polyester film may be used alone or in combination.

The deposition thin film may be produced by vacuum vapor deposition, electro beam (EB) deposition, sputtering, ion-plating, or the like. In view of the productivity and the cost, vacuum vapor deposition is most preferable.

Preferably, a surface of the film is subjected to preliminary treatment, such as corona discharge and application of an anchor coating material, in order to increase the adhesion between the biaxially oriented polyester film and the deposition layer.

The biaxially oriented polyester film provided with the vapor deposition layer of the present invention has excellent flex resistance. When it is used to make a bag, the gas barrier properties of the bag does not greatly decrease even when the bag is bended and deformed. Moreover, since such a biaxially oriented polyester film has excellent heat resistance and high elastic modulus, the film rarely undergoes degradation of gas barrier properties resulting from breaking of the vapor deposition layers caused by stretching of the film by the tensile force applied during processing after the vapor deposition.

Moreover, when the biaxially oriented polyester film of the present invention is used for packaging, at least one surface of the biaxially oriented polyester film is preferably provided with a heat sealing layer having a melting point of 100 to 230° C.

In order to impart heat sealability to the biaxially oriented polyester film of the present invention, an non-stretched film called "sealant" composed of polyethylene, an ethylene-vinyl acetate copolymer, an ionomer, or the like may be stacked on the film to form a laminate. Furthermore, another stretched film, such as a nylon film, a polyester film, or a polypropylene film, may be stacked on the biaxially oriented polyester film provided with a heat sealing layer. This other stretched film is laminated by, for example, a dry lamination method that uses an adhesive, or by an extrusion lamination method.

Next, a preferable method for making the biaxially oriented polyester film of the present invention is specifically described.

For example, the following method may be employed to prepare an aromatic polyester, polyethylene terephthalate.

To a mixture of 100 wt % of dimethyl terephthalate and 60 wt % of ethylene glycol, 0.09 wt % of magnesium acetate and 0.03 wt % of antimony trioxide are added based on the amount of the dimethyl terephthalate. The mixture is heated by a conventional method to conduct transesterification. To the reaction product of the transesterification, 0.020 wt % of an 85% aqueous solution of phosphoric acid is added based on dimethyl terephthalate to conduct polycondensation phase transfer. The reaction system is gradually vacuumed while being heated, and polycondensation is conducted by a conventional technique at 290° C. under a pressure of 1 mmHg to obtain a polyethylene terephthalate resin having a desired limiting viscosity. When particles are to be added, the polymerization is preferably conducted using a slurry containing particles dispersed in ethylene glycol.

The polytetramethylene terephthalate may be produced by, for example, the following method.

A mixture of 100 wt % of terephthalic acid and 110 wt % of 1,4-butanediol is heated in a nitrogen atmosphere to 140° C. to prepare a homogeneous mixture, and 0.054 wt % of tetra-n-butyl orthotitanate and 0.054 wt % of monohydroxybutyltin oxide based on the terephthalic acid are added to the mixture to conduct esterification by a conventional technique. To the resulting product, 0.066 wt % of tetra-n-butyl orthotitanate is added, and polycondensation is conducted under a reduced pressure to obtain a polybutylene terephthalate resin having a desired limiting viscosity.

When the aromatic polyester to be contained in the A and B layers contains ethylene terephthalate and tetramethylene terephthalate units, the polyethylene terephthalate and the polytetramethylene terephthalate obtained as above may be preliminarily mixed in a twin-screw extruder. Moreover, in order not to increase the difference in viscosity during melting, the degree of polymerization of each polyester may be adjusted, and resin chips are preferably used during the extrusion for making the film. Furthermore, the resin mixture for the B layers may be a mixture of resin chips of respective resins. In order to obtain a film containing a thermoplastic resin having a glass transition temperature of 20° C. or less and good dispersibility, the method that uses master chips prepared by preliminarily kneading polyethylene terephthalate or polytetramethylene terephthalate and a high concentration of a thermoplastic resin having a low glass transition temperature is particularly preferable.

The polyesters obtained as above are respectively dried in a nitrogen atmosphere, a vacuum atmosphere, or the like, for 5 hours at 150° C., for example. The polyesters are then supplied to the respective extruders and melted. The polyesters are then processed via different channels using filters and gear pumps to remove foreign matter and to proportionate the amount to be extruded. Three layers A/B/A are stacked using a feed block. With a static mixer, the stack is divided into two in the transversal direction and the divided stacks are combined to form a five-layer film. More static mixers may be used so that a desired number of layers can be stacked. Subsequently, the stack is extruded from a T die on a cooling drum to make a sheet.

During this process, a process of applying electrostatic potential to the film using wire electrodes or tape electrodes, a cast process that provides a water film between the casting drum and the extruded polymer sheet, a process for tacking extruded layers of polymers while adjusting the temperature of the casting drum in the range of from the glass transition temperature of the polyester to the glass transition temperature −20° C., or any combination of these processes may be employed to allow the polymer sheets to adhere onto the casting drums and to solidify by cooling. An unstretched film is thereby obtained. Among these cast processes, the process of applying electrostatic potential to the film is preferably used from the standpoint of the productivity and the flatness when the polyester is used.

When a polyolefin is used, an air knife method that presses the polymer sheet against a cooling drum by pressured air is preferably employed. The resulting unstretched film is stretched by a sequential biaxial stretching method in which the film is first in the longitudinal direction and then in the transversal direction, or first stretched in the transversal direction and then in the longitudinal direction. Alternatively, by a simultaneous stretching method in which the film is substantially simultaneously stretched in the transversal direction and in the longitudinal direction.

The stretch ratio for these stretching methods is preferably 2.0 to 6.0 times and more preferably 2.8 to 5.5 times the original size in each direction. The stretching speed is preferably 1,000 to 200,000%/min. The stretching temperature may be any in the range of from glass transition temperature to (glass transition temperature +100° C). The stretching temperature is preferably in 80 to 140° C. In particular, the temperature for the longitudinal stretching is preferably 90 to 125° C., and the temperature for the transversal stretching is 80 to 130° C. The stretching may be performed two or more times in each direction.

Upon completion of the biaxial stretching, the film is heat-treated. The film may be heated by any conventional method, such as in an oven or on heated rollers. The temperature for heating may be any in the range of from 120° C. to the melting point of the polyester. The temperature is preferably 120 to 230° C. from the standpoint of moldability and impact resistance. If the temperature is in this preferable range, the impact resistance will be high without degrading the moldability. The heating temperature is more preferably 150 to 220° C. and most preferably 170 to 210° C. from the standpoint of impact resistance after molding. The heating time may be any as long as other properties are not degraded but is preferably 1 to 60 seconds. The heating may be conducted while relaxing the film in the longitudinal and/or transversal direction. Moreover, at least one surface of the film may be subjected to corona discharge or provided with a coating layer so as to increase the adhesion to an ink printing layer, an adhesive, or a vapor deposition layer.

(Measurement of Characteristics and Evaluation of Effects)

The Processes for measuring the characteristics and evaluating effects are as follows.

(1) Melting Point and Glass Transition Temperature

Melting point and glass transition temperature were determined with a differential scanning calorimeter (DSC) RDC 220 produced by Seiko Instruments Inc. A sample (5 mg) was set to the DSC and heated from 25 to 300° C. at a heating rate of 10° C./min. The endothermic peak temperature resulting from melting of crystals was determined as the melting point. For a resin having a glass transition temperature of 0° C. or lower, the resin was heated from −100 to 300° C. at a heating rate of 10° C./min to determine the glass transition temperature.

When the measurement was conducted on a film sample (5 mg) under the conditions described above and two or more melting peaks, i.e., melting points based on the endothermic peaks resulting from melting of the crystals, were detected, the peak temperature of the greatest endothermic peak was determined as the primary melting point.

When only one melting peak, i.e., melting point based on the endothermic peak resulting from the melting of crystals, was detected, the peak temperature at this endothermic peak was determined as the primary melting point.

(2) The Number of Layers, the Average Thickness Ta and Tb, and the Thickness Ratio ($\Sigma Ta/\Sigma Tb$)

A section of the film dyed with ruthenium tetroxide was sliced into thin pieces, and the number of layers in the thickness direction was counted using a transmission micrograph. In order to determine the average thickness Ta of the A layers and the average thickness Tb of the B layers of a film constituted from up to nine layers, the thickness at 10 or more positions was measured while varying the field of view of the transmission microscope and was averaged. For a film constituted from 10 or more layers, five or more of A layers and B layers, respectively, were selected as the representative layers, and the thickness of each representative layer was measured at 10 or more positions while varying the field of view of the transmission microscope, and the observed thickness was averaged to determine the average thickness Ta and Tb. Ta and Tb were multiplied by the number of A layers and the number of B layers, respectively, to determine the total thickness $\Sigma Ta$ and $\Sigma Tb$ and the thickness ratio ($\Sigma Ta/\Sigma Tb$).

(3) Flex Pinhole Resistance

A film having dimensions of 297×210 [mm] was subjected to 500 times of flex test using a gelbo tester in a carbon dioxide gas atmosphere at 0° C. according to ASTM F-392. This test was conducted 10 times to calculate the average number of pinholes generated thereby. The smaller the number of pinholes, the higher the quality.

A film having 10 or more pinholes is not suitable as packaging materials.

(4) Drop Bag Strength (Impact Resistance)

Drop Bag Strength Index (Drop Bag Strength 1)

Takelac A610, an adhesive produced by Mitsui Takeda Chemicals, Inc., was mixed with Takenate A50, a hardener produced by Mitsui Takeda Chemicals, Inc., at a 9:1 ratio, and the mixture was diluted with ethyl acetate to prepare an adhesive. The adhesive was applied on a surface of the sample so that the thickness of the applied adhesive after drying was 1 µm, and a multipurpose non-stretched polypropylene sheet, Torayfan NO T3931 produced by Toray Plastic Films Co., LTD., 60 µm in thickness was laminated thereto, and the adhesive was cured at 40° C. for 48 hours to prepare a laminated film. A bag (20 cm×15 cm) having four sides sealed was prepared at 160° C. using a heat sealer, and 250 g of 2.5 wt % brine was enclosed therein. The bag containing the brine was kept in a refrigerator at 0° C. for 8 hours and dropped from a height of 1.25 m at an ambient temperature of 0° C. The number of times the bag was dropped until the bag broke or found pinholes was determined 10 times for each sample. The average number was determined as the drop bag strength index at 0° C.

Drop Bag Strength (Drop Bag Strength 2)

When the above-described multipurpose non-stretched polypropylene sheets are used in applications that require higher drop bag strength, the polypropylene sheets are frequently laminated with sealant films, such as non-stretched polypropylene sheets for high retort or linear low-density polyethylene sheets, having high impact strength so as to compensate for the lack of strength of the non-stretched polypropylene sheets. The drop bag strength 2 of the film was determined as in below to provide an indicator of the drop bag strength when the polypropylene sheets are used together with high-impact sealants.

Takelac A610, an adhesive produced by Mitsui Takeda Chemicals, Inc., was mixed with Takenate A50, a hardener produced by Mitsui Takeda Chemicals, Inc., at a 9:1 ratio, and the mixture was diluted with ethyl acetate to prepare an adhesive. The adhesive was applied on a surface of the sample so that the thickness of the applied adhesive after drying was 1 μm. Torayfan NO ZK93K (grade suitable for high retort) produced by Toray Plastic Films Co. Ltd., 50 μm in thickness was laminated thereto, and the adhesive was cured at 40° C. for 48 hours to prepare a laminated film. A bag (20 cm×15 cm) having four sides sealed was prepared at 160° C. using a heat sealer, and 250 g of 2.5 wt % brine was enclosed therein. The bag containing the brine was kept in the refrigerator at 0° C. for 8 hours and dropped from a height of 1.25 m at an ambient temperature of 0° C. The number of times the bag was dropped until the bag broke or found pinholes was counted 10 times for each sample. The average number was determined as the drop bag strength index 2.

When the drop bag strength index 2 is 10 or smaller, bags easily break during transfer, which is problem.

(5) Mechanical Strength (Elastic Modulus) and Heat Resistance (Strength at Break at 120° C.)

A rectangular sample 200 mm in the film longitudinal direction and 10 mm in the film transversal direction was used. The elasticity modulus, which is an indicator of mechanical strength, was determined according to Japanese Industrial Standards K-7127 (1999) using a tensile tester produced by Toyo Seiki Seisaku-sho Ltd. at 25° C. and 65% RH. The initial distance between the tension chucks was 100 mm and the speed of testing was 300 mm/min. The determination was conducted 20 times while changing samples to obtain an average value.

At an elasticity modulus of 3.0 GPa or less, the elongation or breakage due to the tensile force applied during the process and a decrease in strength of bags occur. Thus, the thickness of the film must be increased or the film must be bonded with other reinforcing films.

Using a sample of the same type described above, the strength at break at 120° C. was determined using a tensile tester, produced by Toyo Seiki Seisaku-sho Ltd., equipped with a thermohygrostat.

When the strength at break at 120° C. is smaller than 100 MPa, problems of film breaking, partial stretching, contraction in the film transversal direction, etc., will occur due to the tensile force applied during processing, such as printing, vapor depositing, or bonding under high temperatures.

(6) Oxygen Permeability (ml/m$^2$·Day)

The oxygen permeability was measured according to JIS K 7129 (1992) using OX-TRAN2/20 produced by Modern Control, Inc., at 20° C. and 0% RH.

(7) Water Vapor Permeability (g/m$^2$·Day)

The water vapor permeability was measured according to JIS K 7129 (1992) using PERMATRAN-W 3/30 produced by Modern Control, Inc., at 40° C. and 90% RH.

(8) Oxygen Permeability (ml/m$^2$·Day) After Repeated Friction

A sample of 200 mm in the film transversal direction and 300 mm in the longitudinal direction was taken from the film. A 20 g aluminum bar was attached to each of an upper end and a lower end of the film so that it lies in the transversal direction. The film was then wound on a SUS stainless steel metal fixed roller having a diameter of 20 mm at 90° with the film surface not provided with the deposition layer being in contact with the roller, so as to determine the oxygen permeability according to JIS K 7129 using OX-TRAN2/20 produced by Modern Control, Inc., at 20° C. and 0% RH.

EXAMPLES

The examples of the present invention will now be described.

(Preparation of Polyesters)

The polyesters and polyetherester described below were used in Examples.

(Polyester 1)

To a mixture of 100 parts by weight of dimethyl terephthalate and 60 parts by weight of ethylene glycol, 0.09 wt % of magnesium acetate and 0.03 wt % of antimony trioxide were added based on the dimethyl terephthalate. The mixture was heated by a conventional technique to conduct transesterification. The ethylene glycol was prepared by mixing particle-free ethylene glycol and an ethylene glycol slurry partly containing aggregated silica particles having an average secondary particle diameter of 1.1 μm so that the resulting polyethylene terephthalate polymer contained 0.05 wt % of aggregated silica. Next, to the reaction product of the transesterification, 0.020 wt % of an 85% aqueous solution of phosphoric acid based on the amount of dimethyl terephthalate was added to conduct polycondensation phase transfer. The reaction system was gradually vacuumed while being heated, and polycondensation is conducted by a conventional technique at 290° C. under a reduced pressure of 1 mmHg to obtain a polyethylene terephthalate resin having a intrinsic viscosity of 0.70 and a melting point of 255° C.

(Polyester 2)

A mixture of 100 parts by weight of terephthalic acid and 110 parts by weight of 1,4-butanediol was heated in a nitrogen atmosphere to 140° C. to prepare a homogeneous mixture, and 0.054 wt % of tetra-n-butyl orthotitanate and 0.054 wt % of monohydroxybutyltin oxide based on the terephthalic acid were added to the mixture to conduct esterification by a conventional technique. To the resulting product, 0.066 wt % of tetra-n-butyl orthotitanate was added, and polycondensation was conducted under a reduced pressure of 1 mmHg to obtain a polybutylene terephthalate resin having an intrinsic viscosity of 0.75. The polyester chips obtained thereby were subjected to solid phase polymerization by a conventional technique to obtain polytetramethylene terephthalate having a melting point of 226° C. and an intrinsic viscosity of 1.25.

(Polyester 3)

An ester 3 (melting point: 234° C.) was produced in the similar manner as the polyester 1 but with 90 mol % of terephthalic acid and 10 mol % of isophthalic acid as the dicarboxylic acid component; and 100 mol % of ethylene glycol as the diol component.

Example 1

To make A layers, a mixture of 80 parts by weight of the polyester 1 and 20 parts by weight of the polyester 2 was used. To make B layers, a mixture of 78 parts by weight of the polyester 1, 20 parts by weight of the polyester 2, and 2 parts by weight of Hytrel 4777 (glass transition temperature: –45° C.) produced by Du Pont-Toray Co., Ltd., was used. The polyester chips of the mixtures were respectively vacuum dried and fed to two single-screw extruders. Melt-extrusion was conducted so that the A layer to B layer ratio of extrude was 4:1, and the layers were combined so that the A layers were laminated on both surfaces of the B layer. Six stages of static mixers for division and lamination were provided so that the resulting laminate was constituted from a total of 129 layers. The laminate was extruded from a T die onto metal rollers cooled to 20° C. while applying electrostatic potentials to obtain an unstretched film. The unstretched film was heated to 90° C. and stretched between rollers to 3.4 times the original size in the longitudinal direction. Subsequently, the film was stretched to 3.7 times the original size in the transversal direction using a tentor-type stretcher at 105° C. The film was then heated for 10 seconds at 210° C. while being relaxed in the transversal direction by 3% and passed through a cooling zone at 100° C. to obtain a biaxially oriented polyester film having a thickness of 12 μm.

Example 2

A biaxially oriented polyester film having a thickness of 12 μm was obtained as in EXAMPLE 1 except that the number of stages of the static mixer was changed to two, and the film was constituted from nine layers.

Example 3

A biaxially oriented polyester film having a thickness of 12 μm was obtained as in EXAMPLE 1 except that the number of stages of the static mixer was changed to one, and the film was constituted from five layers.

Example 4

A biaxially oriented polyester film having a thickness of 12 μm was obtained as in EXAMPLE 1 except that the number of stages of the static mixer was changed to 10, and the film was constituted from 2049 layers.

Example 5

A biaxially oriented polyester film having a thickness of 12 μm was obtained as in EXAMPLE 1 except that a mixture of 75 parts by weight of the polyester 1 and 25 parts by weight of the polyester 2 was used to make the A layers, that a mixture of 42 parts by weight of the polyester 1, 50 parts by weight of the polyester 2, and 8 parts by weight of Hytrel 4777 (glass transition temperature: −45° C.) produced by Du Pont-Toray Co., Ltd., was used to make the B layers, and that the A layer to B layer ratio of extrude was changed to 2:1.

Example 6

A biaxially oriented polyester film having a thickness of 12 μm was obtained as in EXAMPLE 5, except that a mixture of 85 parts by weight of the polyester 1 and 15 parts by weight of the polyester 2 was used to make the A layers and that the A layer to B layer ratio of extrude was changed to 4:5.

Example 7

The polyester 1 was used to make the A layers, and the polyester 2 was used to make the B layers. The mixed polyester chips were respectively vacuum-dried and then fed to two single-screw extruders. The melt extrusion was conducted so that the A layer to B layer ratio of the extrude was 5:1; and the layers were combined so that the A layers were laminated on both surfaces of the B layer. Six stages of static mixers for division and lamination were provided so that the resulting laminate was constituted from a total of 129 layers. The laminate was extruded from a T die onto metal rollers cooled to 20° C. while applying electrostatic potentials to obtain an unstretched film. The unstretched film was heated to 88° C. and stretched between rollers to 3.4 times the original size in the longitudinal direction. Subsequently, the film was stretched to 3.5 times the original size in the transversal direction using a tentor-type stretcher at 100° C. The film was then heated for 20 seconds at 215° C. and passed through a cooling zone at 100° C. to obtain a biaxially oriented polyester film having a thickness of 12 μm.

Comparative Example 1

A biaxially oriented polyester film having a thickness of 12 μm was obtained as in EXAMPLE 1 except that no static mixer was used and that the film consisted of three layers.

Comparative Example 2

A biaxially oriented polyester film having a thickness of 12 μm was obtained as in EXAMPLE 1 except that a mixture of 40 parts by weight of the polyester 1 and 60 parts by weight of the polyester 2 was used to make the A layers and that a mixture of 30 parts by weight of the polyester 1, 76 parts by weight of the polyester 2, and 4 parts by weight of Hytrel 4777 (glass transition temperature: −45° C.) produced by Du Pont-Toray Co., Ltd., was used to make the B layers.

Comparative Example 3

A biaxially oriented polyester film having a thickness of 12 μm was obtained as in EXAMPLE 1 except that a mixture of 38 parts by weight of the polyester 1, 50 parts by weight of the polyester 2, and 12 parts by weight of Hytrel 4777 (glass transition temperature: −45° C.) produced by Du Pont-Toray Co., Ltd., was used to make the B layers.

Comparative Example 4

A biaxially oriented polyester film having a thickness of 12 μm was obtained as in EXAMPLE 1 except that a mixture of 80 parts by weight of the polyester 1 and 20 parts by weight of the polyester 2 was used to make the B layers.

Comparative Example 5

The polyester 1 was used to make the A layers and the polyester 3 was used to make the B layers. The mixed polyester chips were respectively vacuum-dried and then fed to two single-screw extruders. Melt-extrusion was conducted so that the A layer to B layer ratio of discharge was 1:5, and the layers were combined to prepare a three-layer film composed of a B layer and A layers laminated on both surfaces of the B layer. The three-layer film was extruded from a T die onto metal rollers cooled to 20° C. while applying electrostatic potentials to obtain an unstretched film. The unstretched film was heated to 70° C. and stretched between rollers to 3.3 times the original size in the longitudinal direction. Subsequently, the film was stretched to 3.3 times the original size in the transversal direction using a tentor-type stretcher at 80° C. The film was then heated for 5 seconds at 230° C. and passed through a cooling zone at 100° C. to obtain a biaxially oriented polyester film having a thickness of 12 μm.

The properties of the films of EXAMPLES 1–7 and COMPARATIVE EXAMPLES 1–5 are shown in Tables 1 and 2. The biaxially oriented polyester films of all EXAMPLES satisfied the requirements of the present invention and exhibited high bending resistance, impact resistance, mechanical strength, heat resistance, and transparency. In contrast, the biaxially oriented polyester films of COMPARATIVE EXAMPLES did not satisfy the requirements of the present invention and exhibited poor properties.

TABLE 1

| | Total No. of layers | A layers | | | | | B layers | | | | | | Thickness ratio ΣTa/ΣTb |
|---|---|---|---|---|---|---|---|---|---|---|---|---|---|
| | | Polyester 1 content (wt %) | Polyester 2 content (wt %) | Melting point (° C.) | Average thickness Ta (nm) | No. of layers | Polyester 1 content (wt %) | Polyester 2 content (wt %) | Low glass transition point resin[1]) (wt %) | Melting point (° C.) | Average thickness Ta (nm) | No. of layers | |
| EXAMPLE 1 | 129 | 80 | 20 | 252 | 148 | 65 | 78 | 20 | 2 | 252 | 38 | 64 | 4.0 |
| EXAMPLE 2 | 9 | 80 | 20 | 252 | 1920 | 5 | 78 | 20 | 2 | 252 | 600 | 4 | 4.0 |
| EXAMPLE 3 | 5 | 80 | 20 | 252 | 3200 | 3 | 78 | 20 | 2 | 252 | 1200 | 2 | 4.0 |
| EXAMPLE 4 | 2049 | 80 | 20 | 252 | 9.4 | 1025 | 78 | 20 | 2 | 252 | 2.3 | 1024 | 4.1 |
| EXAMPLE 5 | 129 | 85 | 15 | 253 | 148 | 65 | 42 | 52 | 8 | 240 | 38 | 64 | 4.0 |
| EXAMPLE 6 | 129 | 75 | 25 | 249 | 148 | 65 | 42 | 52 | 8 | 240 | 38 | 64 | 4.0 |
| EXAMPLE 7 | 129 | 100 | 0 | 255 | 154 | 65 | 0 | 100 | 0 | 226 | 31 | 64 | 5.0 |
| COMPARATIVE EXAMPLE 1 | 3 | 80 | 20 | 252 | 4800 | 2 | 78 | 20 | 2 | 252 | 2400 | 1 | 4.0 |
| COMPARATIVE EXAMPLE 2 | 129 | 80 | 20 | 252 | 148 | 65 | 80 | 20 | 0 | 252 | 38 | 64 | 4.0 |
| COMPARATIVE EXAMPLE 3 | 129 | 40 | 60 | 240 | 148 | 65 | 78 | 20 | 2 | 252 | 38 | 64 | 4.0 |
| COMPARATIVE EXAMPLE 4 | 129 | 80 | 20 | 252 | 148 | 65 | 38 | 50 | 12 | 238 | 38 | 64 | 4.0 |
| COMPARATIVE EXAMPLE 5 | 3 | 100 | 0 | 255 | 1714 | 2 | Polyester 3 100 wt % | | | 234 | 8571 | 1 | 5.0 |

[1]Low glass transition point resin: Hytrel 4777 (glass transition temperature: −45° C.) produced by Du Pont-Toray Co., Ltd.

TABLE 2

| | Primary melting point (° C.) | Flex pinhole resistance (no. of pinholes) | Drop bag strength | | Mechanical strength (elasticity modulus) (GPa) | Heat resistance (high temperature strength at break (MPa) | Haze (%) |
|---|---|---|---|---|---|---|---|
| | | | Drop bag strength index (drop bag strength 1) | Drop bag strength 2 (the no. of times bag is dropped) | | | |
| EXAMPLE 1 | 252 | 0 | 3.0 | 19 | 4.4 | 130 | 3.0 |
| EXAMPLE 2 | 252 | 4.0 | 2.7 | 16 | 4.5 | 132 | 3.0 |
| EXAMPLE 3 | 252 | 8.0 | 2.3 | 13 | 4.5 | 132 | 3.0 |
| EXAMPLE 4 | 252 | 3.0 | 2.3 | 11 | 4.2 | 125 | 3.2 |
| EXAMPLE 5 | 253 | 0.8 | 2.5 | 12 | 3.8 | 120 | 5.0 |
| EXAMPLE 6 | 249 | 0.4 | 2.4 | 12 | 3.8 | 120 | 7.0 |
| EXAMPLE 7 | 255 | 2.4 | 2.1 | 11 | 3.5 | 115 | 3.0 |
| COMPARATIVE EXAMPLE 1 | 252 | 15 | 1.1 | 7 | 4.5 | 133 | 3.0 |
| COMPARATIVE EXAMPLE 2 | 252 | 4.0 | 1.2 | 7 | 4.5 | 135 | 3.0 |
| COMPARATIVE EXAMPLE 3 | 240 | 4.0 | 1.0 | 7 | 1.5 | 20 | 2.5 |
| COMPARATIVE EXAMPLE 4 | 252 | 8.0 | 2.1 | 12 | 2.5 | 65 | 4.0 |
| COMPARATIVE EXAMPLE 5 | 234 | 0.2 | 2.6 | 17 | 2.5 | 85 | 18.0 |

Example 8

One surface of the biaxially oriented polyester film prepared in EXAMPLE 1 was subjected to corona discharge, and aluminum oxide was deposited on the treated surface using a continuous vacuum evaporation system to form a biaxially oriented polyester film provided with a deposition layer having a thickness of 40 nm on one surface. The oxygen transmission rate, the water vapor transmission rate, and the oxygen transmission rate after repeated friction of the biaxially oriented polyester film provided with the aluminum oxide deposition layer were determined. The results are shown in Table 3.

Comparative Example 6

As in EXAMPLE 8, one surface of the biaxially oriented polyester film prepared in COMPARATIVE EXAMPLE 3 was subjected to corona discharge, and aluminum oxide was deposited on the treated surface using a continuous vacuum evaporation system to form a biaxially oriented polyester film provided with a deposition layer having a thickness of 40 nm on one surface. The oxygen transmission rate, the water vapor transmission rate, and the oxygen transmission rate after repeated friction of the biaxially oriented polyester film provided with the aluminum oxide deposition layer were determined. The results are shown in Table 3.

Comparative Example 7

As in EXAMPLE 8, one surface of the biaxially oriented polyester film prepared in COMPARATIVE EXAMPLE 4 was subjected to corona discharge, and aluminum oxide was deposited on the treated surface using a continuous vacuum evaporation system to form a biaxially oriented polyester film provided with a deposition layer having a thickness of 40 nm on one surface. The oxygen transmission rate, the water vapor transmission rate, and the oxygen transmission rate after repeated friction of the biaxially oriented polyester film provided with the aluminum oxide deposition layer were determined. The results are shown in Table 3.

The biaxially oriented polyester film with the aluminum oxide deposition layer of EXAMPLE 8 exhibits excellent oxygen transmission rate even after friction was repeatedly applied to the deposition film. In contrast, the biaxially oriented polyester films with the aluminum oxide deposition layers of COMPARATIVE EXAMPLES 6 and 7 showed a significant decrease in oxygen transmission rate after repeated friction on the deposition films.

TABLE 3

|  | Oxygen permeability (ml/m² · day) | Water vapor permeability (g/m² · day) | Oxygen permeability after repeated friction (ml/m² · day) |
|---|---|---|---|
| EXAMPLE 8 | 0.2 | 0.3 | 1.0 |
| COMPARATIVE EXAMPLE 6 | 0.5 | 1.0 | 9.0 |
| COMPARATIVE EXAMPLE 7 | 0.3 | 0.4 | 7.0 |

INDUSTRIAL APPLICABILITY

The biaxially oriented polyester film of the present invention has superior heat resistance, mechanical strength, impact resistance, and flex resistance and is particularly suitable for packaging materials.

The invention claimed is:

1. A biaxially oriented polyester film having a drop bag strength index of the film at 0° C. of at least 2.0, and a strength at break in the film longitudinal direction at 120° C. of at least 100 MPa, in which the film comprising a polyester as the main component having a primary melting point in the range of 245 to 265° C.

2. The biaxially oriented polyester film according to claim 1, wherein the thickness of the film is 5 to 40 μm.

3. The biaxially oriented polyester film according to claim 1, wherein the elastic modulus in the film longitudinal direction and the elasticity modulus in the film transversal direction are at least 3 GPa.

4. The biaxially oriented polyester film according to claim 1, comprising a total of at least five layers of layers (A layers) mainly composed of an aromatic polyester having a melting point of 245 to 265° C. and layers (B layers) composed of a thermoplastic resin mixture having a melting point of 215 to 265° C., these layers being alternately stacked, wherein the thermoplastic resin mixture contained in the B layers contains 90 to 99.8 wt % of an aromatic polyester and 0.2 to 10.0 wt % of a thermoplastic resin having a glass transition temperature of 20° C. or less.

5. The biaxially oriented polyester film according to claim 4, wherein a total of nine or more of the A layers and the B layers are alternately stacked, and the average thickness of the respective layers is 0.02 to 0.5 μm.

6. The biaxially oriented polyester film according to claim 4, wherein the repeating units of the aromatic polyester contained in the A layers are 70 to 95 mol % ethylene terephthalate units and 5 to 30 mol % tetramethylene terephthalate units, and the total content of the ethylene terephthalate units and the tetramethylene terephthalate units is 90 mol % or more.

7. The biaxially oriented polyester film according to claim 4, wherein the thermoplastic resin mixture contained in the B layers contains the aromatic polyester and 0.2 to 10.0 wt % of the thermoplastic resin having a glass transition temperature of 30° C. or less, the repeating units of the aromatic polyester being 20 to 90 mol % ethylene terephthalate units and 10 to 80 mol % tetramethylene terephthalate units and the total content of the ethylene terephthalate units and the tetramethylene terephthalate units being 90 mol % or more.

8. The biaxially oriented polyester film according to claim 4, wherein the ratio of the total thickness ΣTa of the A layers to the total thickness ΣTb of the B layers is in the range of 1 to 10.

9. The biaxially oriented polyester film according to claim 4, wherein the difference between the melting point of the polyester constituting the A layers and the melting point of the resin mixture constituting the B layers is 10° C. or less.

10. The biaxially oriented polyester film according to claim 4, wherein the outermost layers of the film are the A layers.

11. A biaxially oriented polyester film comprising the biaxially oriented polyester film according to claim 1 and a deposition layer composed of at least one metal compound selected from the group consisting of metallic aluminum, aluminum oxide, and silicon oxide, the deposition layer being provided on at least one surface of the biaxially oriented polyester film of claim 1.

12. A biaxially oriented polyester film comprising the biaxially oriented polyester film according to claim 1 and a heat sealing layer having a melting point of 100 to 230° C. and being provided on at least one surface of the biaxially oriented polyester film of claim 1.

* * * * *